United States Patent
Saxton et al.

(10) Patent No.: US 10,630,990 B1
(45) Date of Patent: *Apr. 21, 2020

(54) ENCODER OUTPUT RESPONSIVE TO QUALITY METRIC INFORMATION

(71) Applicant: Amazon Technologies, Inc., Seattle, WA (US)

(72) Inventors: John Robert Saxton, Portland, OR (US); Khawaja Salman Shams, Portland, OR (US); Kevin Moore, Portland, OR (US); Ryan Paul Hegar, Happy Valley, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/968,669

(22) Filed: May 1, 2018

(51) Int. Cl.
  *H04L 29/06* (2006.01)
  *H04N 19/136* (2014.01)

(52) U.S. Cl.
  CPC ........ *H04N 19/136* (2014.11); *H04L 65/4069* (2013.01); *H04L 65/80* (2013.01)

(58) Field of Classification Search
  CPC .... H04N 19/136; H04L 65/4069; H04L 65/80
  USPC .................................................. 375/240.28
  See application file for complete search history.

(56) References Cited

U.S. PATENT DOCUMENTS

| | | | |
|---|---|---|---|
| 5,647,049 A | 7/1997 | Odaka | |
| 5,715,009 A | 2/1998 | Tahara | |
| 5,805,225 A | 9/1998 | Tahara | |
| 6,125,143 A | 9/2000 | Suzuki | |
| 6,724,821 B1 | 4/2004 | Sawada | |
| 8,422,546 B2 * | 4/2013 | Lin | H04N 19/176 375/240 |
| 9,126,274 B2 | 9/2015 | Firth | |
| 9,137,528 B1 | 9/2015 | Wu | |
| 9,167,274 B1 | 10/2015 | Gu | |
| 9,237,343 B2 * | 1/2016 | Cohen | H04N 19/176 |
| 9,313,248 B2 | 4/2016 | Epstein | |
| 9,491,498 B2 * | 11/2016 | Brooks | H04N 21/23439 |
| 2006/0268990 A1 * | 11/2006 | Lin | H04N 19/176 375/240.24 |
| 2007/0019874 A1 | 1/2007 | Sethuraman | |
| 2007/0165718 A1 | 7/2007 | Okazaki | |
| 2007/0223582 A1 * | 9/2007 | Borer | H04N 19/619 375/240.12 |
| 2008/0207182 A1 | 8/2008 | Maharajh | |

(Continued)

OTHER PUBLICATIONS

Davis et al, Efficient Delivery within the MPEG-21 Framework (Year: 2005).*

*Primary Examiner* — Shan E Elahi
(74) *Attorney, Agent, or Firm* — Knobbe, Martens, Olson & Bear, LLP

(57) ABSTRACT

A video packaging and origination service can include one or more encoder components that receive content for encoding and transmitting to requesting entities. During the operation of the encoder components, individual encoders receive input signals for encoding and determine quality metric information related to the generation of an encoded segment. The encoder components exchange quality metric information and an encoder component is selected to transmit an encoded segment. The selection of an individual encoder component per segment can continue throughout the streaming process.

20 Claims, 8 Drawing Sheets

(56) References Cited

U.S. PATENT DOCUMENTS

| | | | |
|---|---|---|---|
| 2009/0040303 A1* | 2/2009 | Finn | H04N 7/181 |
| | | | 348/143 |
| 2011/0225417 A1 | 9/2011 | Maharajh | |
| 2012/0272285 A1* | 10/2012 | Brooks | H04N 21/23439 |
| | | | 725/146 |
| 2012/0321001 A1 | 12/2012 | Raveendran | |
| 2013/0039412 A1 | 2/2013 | Narroschke | |
| 2013/0064527 A1* | 3/2013 | Maharajh | G06F 16/957 |
| | | | 386/343 |
| 2013/0114744 A1* | 5/2013 | Mutton | H04N 19/40 |
| | | | 375/240.26 |
| 2013/0166580 A1* | 6/2013 | Maharajh | H04L 65/605 |
| | | | 707/758 |
| 2014/0169451 A1* | 6/2014 | Cohen | H04N 19/176 |
| | | | 375/240.03 |
| 2014/0328384 A1* | 11/2014 | Novotny | H04N 21/23655 |
| | | | 375/240.02 |
| 2015/0249828 A1 | 9/2015 | Rosewarne | |
| 2015/0296224 A1* | 10/2015 | Davis | H04N 19/154 |
| | | | 375/240.26 |
| 2015/0312601 A1* | 10/2015 | Novotny | H04N 21/23655 |
| | | | 725/117 |
| 2016/0360206 A1 | 12/2016 | Wu | |
| 2017/0331914 A1* | 11/2017 | Loach | H04L 65/80 |

* cited by examiner

ENCODER OUTPUT RESPONSIVE TO QUALITY METRIC INFORMATION

BACKGROUND

Generally described, computing devices and communication networks can be utilized to exchange data and/or information. In a common application, a computing device can request content from another computing device via the communication network. For example, a user at a personal computing device can utilize a browser application to request a content page (e.g., a network page, a Web page, etc.) from a server computing device via the network (e.g., the Internet). In such embodiments, the user computing device can be referred to as a client computing device and the server computing device can be referred to as a content provider.

Content providers provide requested content to client computing devices often with consideration of image quality of the requested content as reconstructed at the client computing device. Artifacts resulting from the encoding process can lead to degradation of content image when it is reconstructed at the client computing device.

Some content providers attempt to facilitate the delivery of requested content through the utilization of a content delivery network ("CDN") service provider. As with content providers, CDN service providers also provide requested content to client computing devices often with consideration of image quality of the requested content to the client computing device. Accordingly, CDN service providers often consider image quality as part of the delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
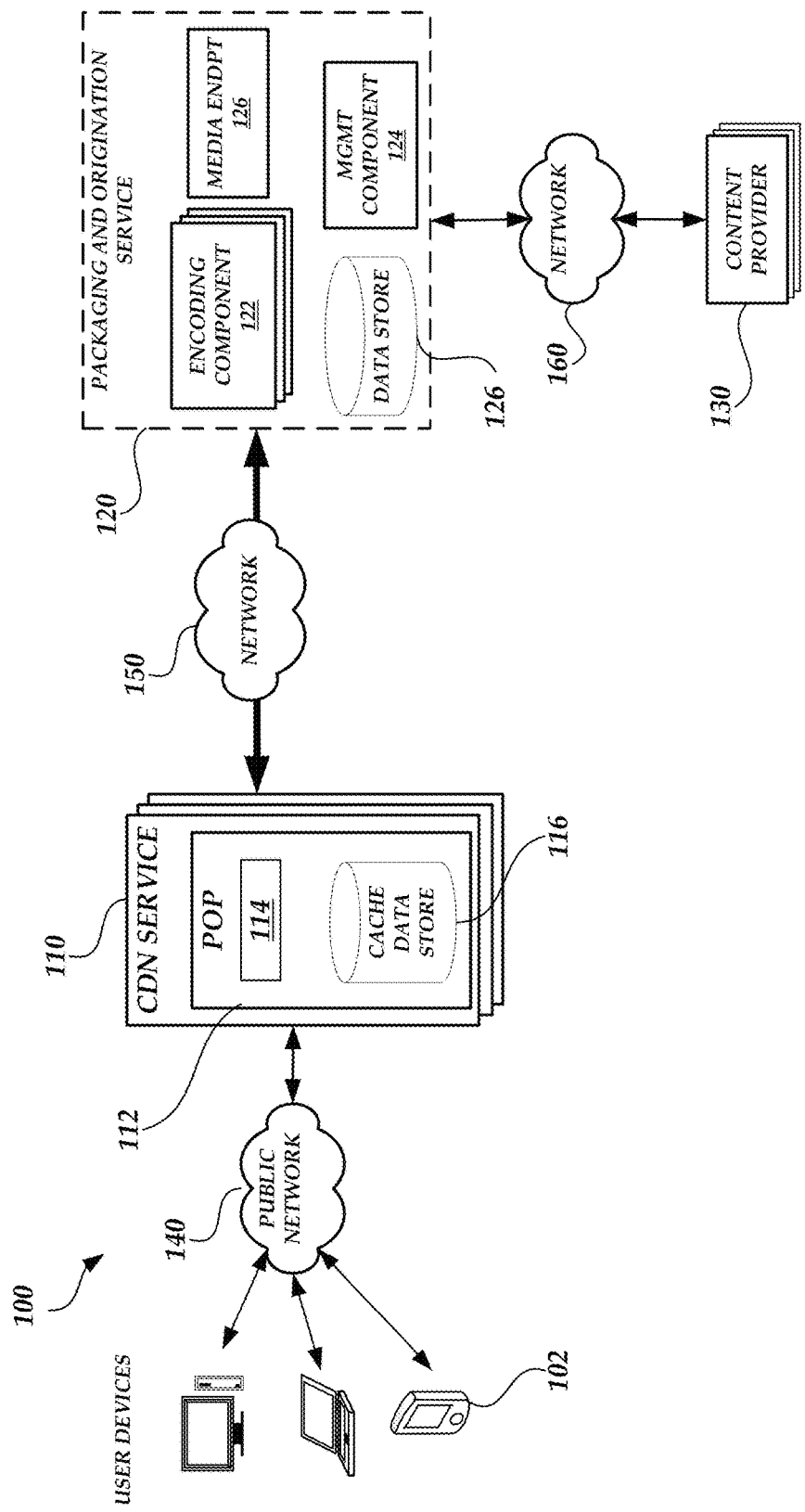
FIG. 1 is a block diagram of a content delivery environment that includes one or more client devices, one or more edge locations, and a video packaging system in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream. The encoding format can correspond to a content representation format for storage or transmission of video content (such as in a data file or bitstream). Examples of encoding formats include but not limited to the motion pictures expert group ("MPEG) MPEG-2 Part 2, MPEG-4 Part 2, H.264 (MPEG-4 Part 10), H.265 high efficiency video coding ("HEVC"), Theora, RealVideo RV40, VP9, and AOMedia Video 1 ("AV1"), and the like.

In some scenarios, a video packaging and origination service can distribute the computing devices, such as encoding components, among areas, generally referred to as availability zones. Such different areas can be defined according to geological or logical criteria. As applied to encoding content, a video packaging and origination service can set up of groups of encoding components according to different availability zones. Still further, a video packaging and origination service can configure one or more encoder components from different availability zones such that two or more encoder components can redundantly provide encoded content segments to a destination, such as a media endpoint (e.g., storage location) or a media playing application.

One approach to processing redundant encoder component outputs includes the utilization of an application or logic to receive multiple encoder component output segments and select which received encoded segment to utilize in rendering of the encoded content. In the simplest embodiment, a media endpoint or media playing application can select the first encoded segment that is received. In other embodiments, each encoder component can provide metadata in the transmission of the encoded content segments that is used by the media endpoint or media playing application to select from redundantly received encoded content segments. In such embodiments, however, the media endpoint or media playing application require the additional logic, such as an application or configuration, that facilitates receipt of encoded segments from two or more encoder components and selection of the redundant encoded content segments. Such implementations can be inefficient in requiring the additional logic, especially for media playing applications. Additionally, the video packaging and origination service further needs to maintain or update the logic on the vast number of media endpoints or media playing applications as selection criteria, such as thresholds, changes.

Aspects of the present application correspond to a content streaming system and methodology for managing encoder components. More specifically, in an illustrative embodiment, a video packaging and origination service can include two or more encoder components that receive content for encoding and transmitting to requesting entities. Illustratively, the content can be provided by a content provider, which configures the video packaging and origination service to encode one or more content streams in response to requests for the content streams. Individual encoder components receive or access content, encode the content according to one or more encoding profiles defined by an encoding bitrate and format, and make the encoded content streams available for transmission.

Illustratively, two or more of the encoder components can correspond to different availability zones, which are defined by geographic or logical criteria. At least some of the encoder components in the different availability zones can receive separate input signals from the content provider such that encoder components receive substantially the same content from different sources. Each encoder component can generate or determine quality metric information associated with the generation of encoded content segments. By way of non-limiting examples, the quality metric information can include a determination of the availability of the encoder component to generate the encoded content, a quality measurement of the input signal received by the encoder component and an assessment of the ability for the encoder component to transmit the encoded segment to the destination (e.g., a media endpoint or a media playing application). Additional or alternative information can also be included in the quality metric information.

Prior to encoding the content segment or after encoding a content segment (prior to transmission), at least some portion of the encoder components can exchange quality metric information. Each encoder component can then implement an encoder coordination process that facilitates the designation of a single encoder component to transmit the encoded segment. The encoder coordination process can include the identification of the particular encoder component that will transmit the encoded segment or simply the individual decision at each encoder component that results in a single encoder component transmitting the encoded segment and the remaining encoder components refraining from transmission (or otherwise discarding/avoiding the encoded segment). Still further, the encoder coordination process implemented by encoder components can further weigh in favor of the encoder component that transmitted the previous encoder segment (or segments). In still further embodiments, the video packaging and origination service can also maintain a management component to facilitate the execution of the encoder coordination process in at least some of the encoder components.

Based on the exchange of quality metric information, the video packaging and origination service can continue to leverage the benefit of redundantly configured encoder components in different availability zones. However, the video packaging and origination service can minimize the need for additional processing logic or applications to process redundant content streams. Additionally, the video packaging and origination service can maintain full control of the selection logic implemented at the encoder components, which makes the management of the redundant encoder components more efficient.

FIG. 1 illustrates a general content delivery environment 100 for delivering content from original content providers to user devices. The content delivery environment 100 includes a plurality of devices 102 utilized by individual users, generally referred to as user computing devices, to request streaming or download content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), Smooth Streaming, and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User computing devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance (e.g., a thermostat or refrigerator), controller, digital media player, watch, eyewear, a home or car device, Internet of Things ("IoT") devices, virtual reality or augmented reality devices, and the like. Each user computing device 102 may optionally include one or more data stores (not shown in FIG. 1) including various applications or computer-executable instructions, such as web browsers, used to implement the embodiments disclosed herein. Illustrative components of a user computing device 102 will be described with regard to FIG. 2.

In some embodiments, a CDN service provider 110 may include multiple edge locations from which a user device can retrieve content. Individual edge location 112 may be referred to herein as a point of presence ("POP"), where a POP 112 is intended to refer to any collection of related computing devices utilized to implement functionality on behalf of one or many providers. POPs are generally associated with a specific geographic location in which the computing devices implementing the POP are located, or with a region serviced by the POP. As illustrated in FIG. 1, the POP 112 can include one or more processing components 114 for processing information for managing content provided by the video packaging and origination service 120. The POP 112 can further include a data store 116 for maintaining collected information. For example, a data center or a collection of computing devices within a data center may form a POP. In some instances, the POPs may implement one or more services, such as CDN services, data storage services, data processing services, etc. The CDN service provider 110 may include multiple POPs located in different geographic locations so that user devices can communicate with a nearby a POP to retrieve content, thereby reducing the latency of delivering requested content.

Networks 140, 150, 160 may be any wired network, wireless network, or combination thereof. In addition, the networks 140, 150, 160 may be a personal area network, local area network, wide area network, cable network, fiber network, satellite network, cellular telephone network, data network or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the client computing devices 102 and CDN service provider 110 are depicted as having a single connection to the network 140, individual components of the client computing devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number or combination of networks.

The content delivery environment 100 can include a plurality of content providers 130 for delivering input signals to the video packaging and origination service 120. The content providers may include one or more servers for delivering content, a data store for maintaining content and a communication manager for facilitating communications to the video packaging and origination service 120 over network°160. In other embodiments, the content provider 130 can further user devices 120 that are generating live video feeds for transmission by the video packaging and origination service 120. As will be described in detail below, illustratively, the content provider 130 can include or provide multiple, distinct input signals to the video packaging and origination service 120.

In accordance with embodiments, the video packaging and origination service 120 includes a set of encoding components 122 for receiving content provided by the content providers 130 (or other source) and processing the content to generate a set of encoded video segments available for delivery. The video packaging and origination service 120 can further include a data store 126 for maintaining collected content streaming information, update information, or configuration information. The video packaging and origination service 120 is further optionally associated with a management component 124 to facilitate the determination of an encoder component 122 to transmit a requested content segment. The management component 124 can delegate at least some portion of the identified functionality to the encoder components themselves, such as the determination or negotiation of the handover or stop events.

It will be appreciated by those skilled in the art that the video packaging and origination service 120 may have fewer or greater components than are illustrated in FIG. 1. Thus, the depiction of the video packaging and origination service 120 in FIG. 1 should be taken as illustrative. For example, in some embodiments, components of the video packaging and origination service 120 may be executed by one or more virtual machines implemented in a hosted computing environment. A hosted computing environment may include one or more rapidly provisioned and released computing resources, which computing resources may include computing, networking or storage devices.

Figure 2:
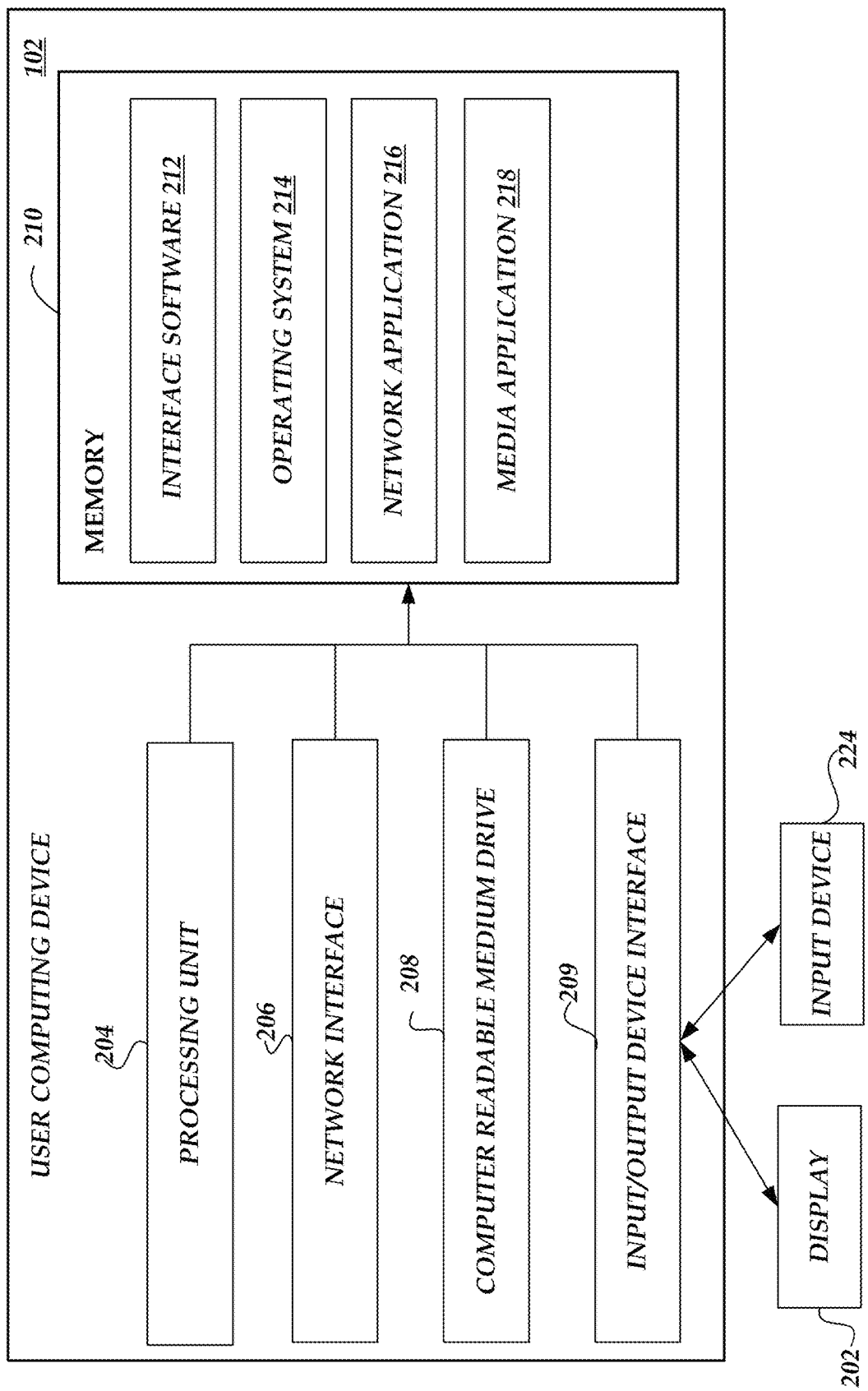
FIG. 2 is a block diagram of illustrative components of a client computing device configured to remotely process content in accordance with some embodiments.

FIG. 2 depicts one embodiment of an architecture of an illustrative user computing device 102 that can generate content requests and process metric information in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, an input/output device interface 209, an optional display 202, and an input device 224, all of which may communicate with one another by way of a communication bus.

The network interface 206 may provide connectivity to one or more networks or computing systems, such as the network 140 of FIG. 1 and the video packaging and origination service 120 or the content provider 130. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the video packaging and origination service 120 via the CDN service provider 110. In another example, in one embodiment, the memory 210 includes a specific media player application for accessing content, decoding the encoded content, and communicating with the CDN service provider 110.

Figure 3:
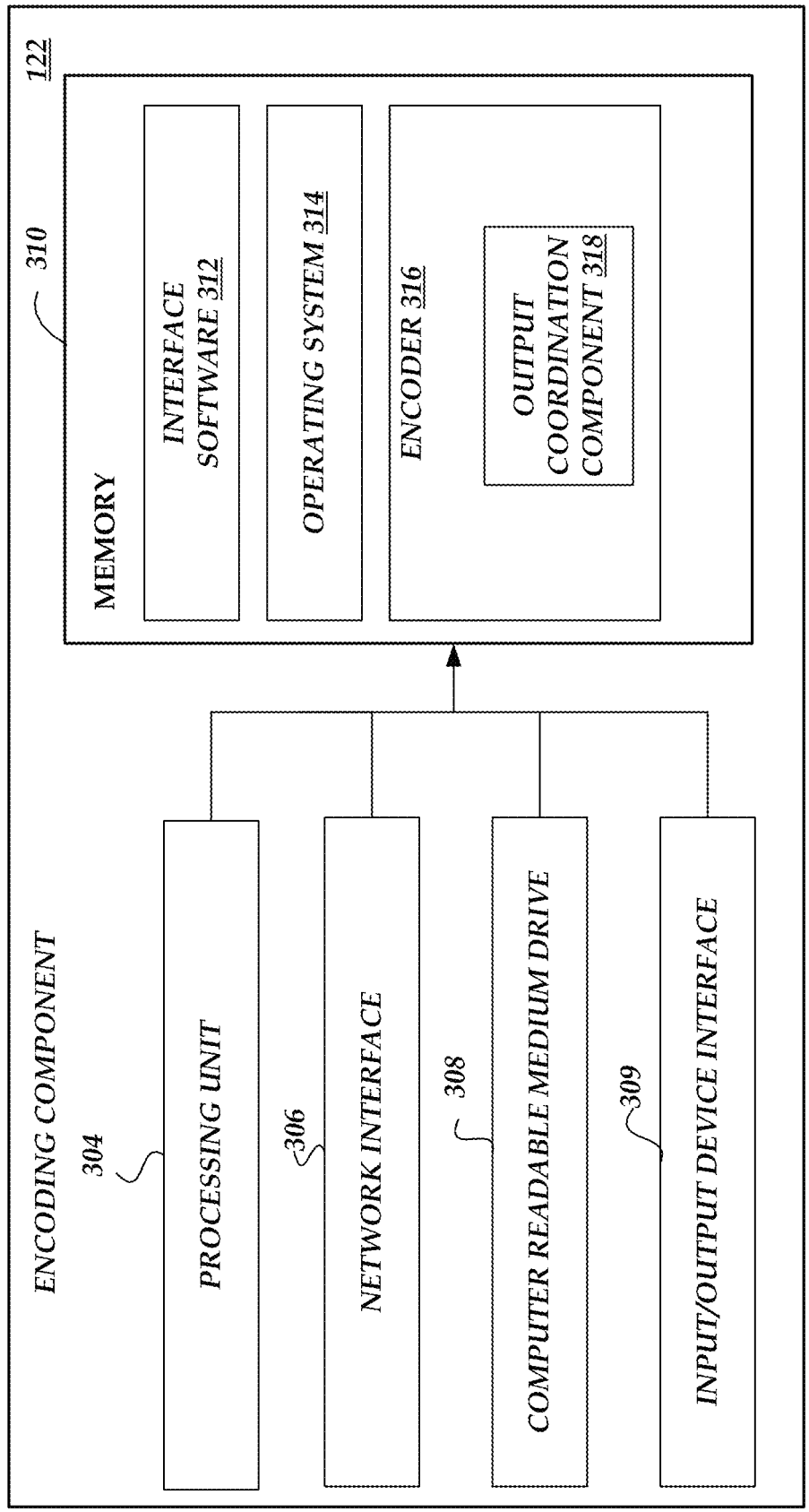
FIG. 3 is a block diagram of illustrative components of an encoder of a packaging and origination service configured to implement an encoder coordination process in accordance with some embodiments.

FIG. 3 depicts one embodiment of an architecture of an illustrative encoding component 122 for implementing the video packaging and origination service 120 described herein. The general architecture of the encoding component 122 depicted in FIG. 3 includes an arrangement of computer hardware and software components that may be used to implement aspects of the present disclosure. As illustrated, the encoding component 122 of the video packaging and origination service 120 includes a processing unit 304, a network interface 306, a computer readable medium drive 308, an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. Memory 310 includes an encoder 316 for encoding video segments to be sent to user devices 102 in response to content requests.

As will be described in detail below, the encoder 316 includes an output coordination component 318 for managing the interactions between encoder components and making determinations whether individual encoder components should transmit an encoded segment. Illustratively, each individual encoder component can correspond to the architecture illustrated in FIG. 3. Accordingly, a selection of an encoder component for transmitting an encoded segment does not necessarily include an actual designation or notification of a "selected" encoder component, but can simply correspond to implementation of a decision to transmit or not transmit across a set of encoder component that results in a single encoder component transmitting an encoded segment. Such implementation can be achieved by execution of a common encoder coordination process. In other embodiments, one or more portions of the encoder coordination process can be offset to a management component 124 such that at least some notification of a selected encoder (or not selected encoder) is provided to individual encoder components.

As specified above, in one embodiment, the encoder components 122 illustrated in FIG. 3 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual or logical embodiment unless specifically indicated as such.

Figure 4A:
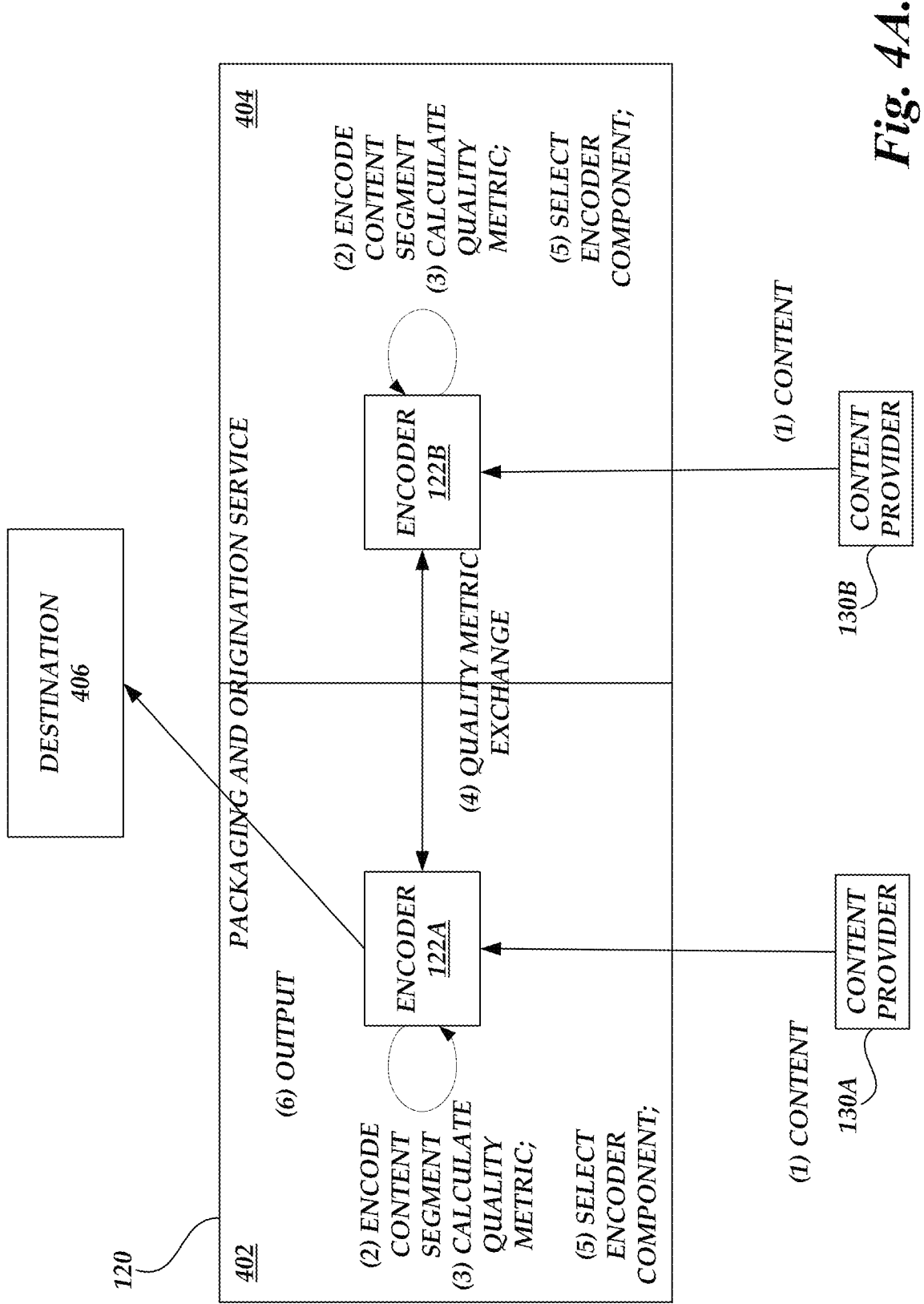
FIGS. 4A-4C are block diagrams of the content delivery environment of FIG. 1 illustrating the interaction in providing encoded content segments with redundant encoders in accordance with some embodiments.
Figure 4B:
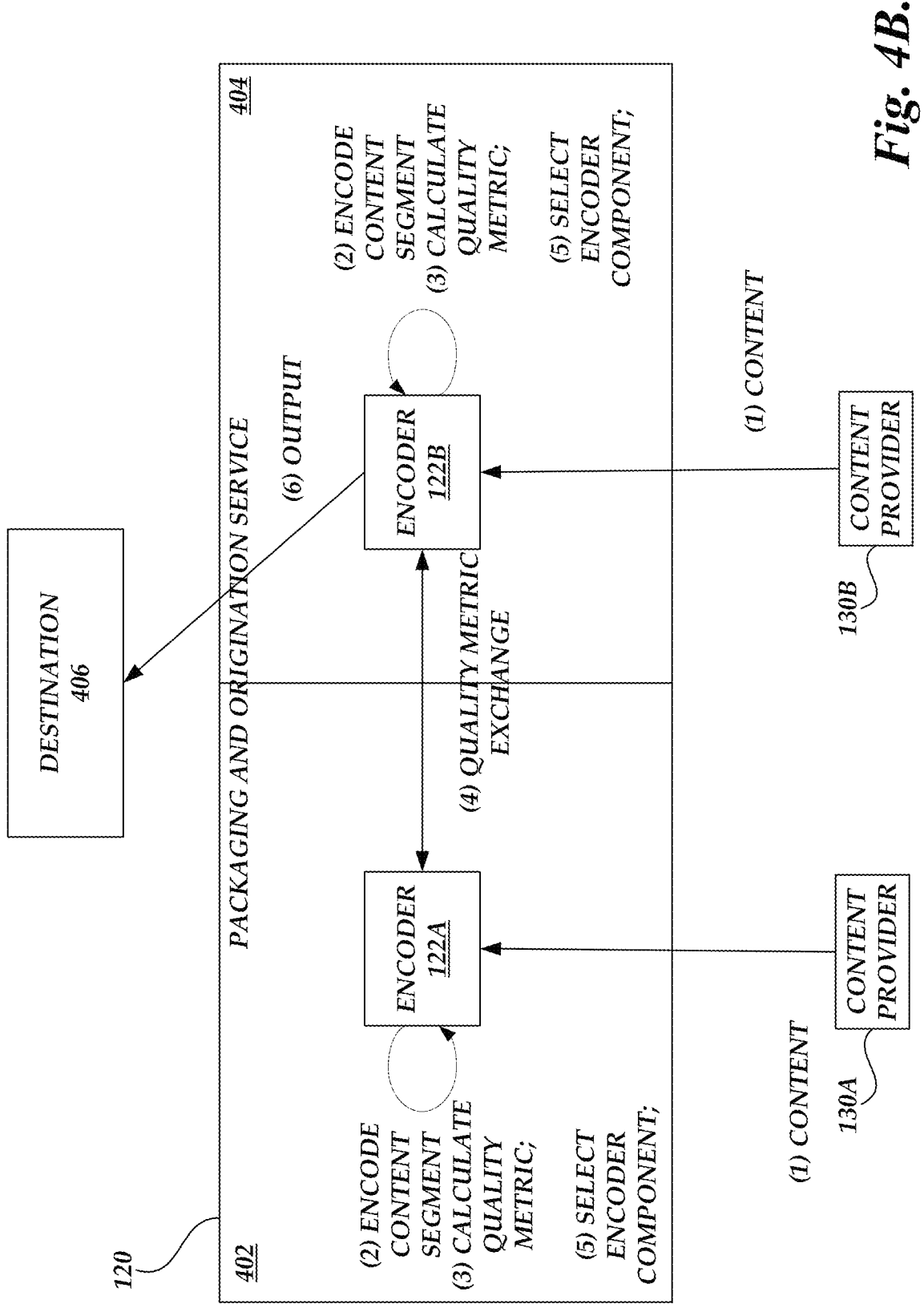
Figure 4C:
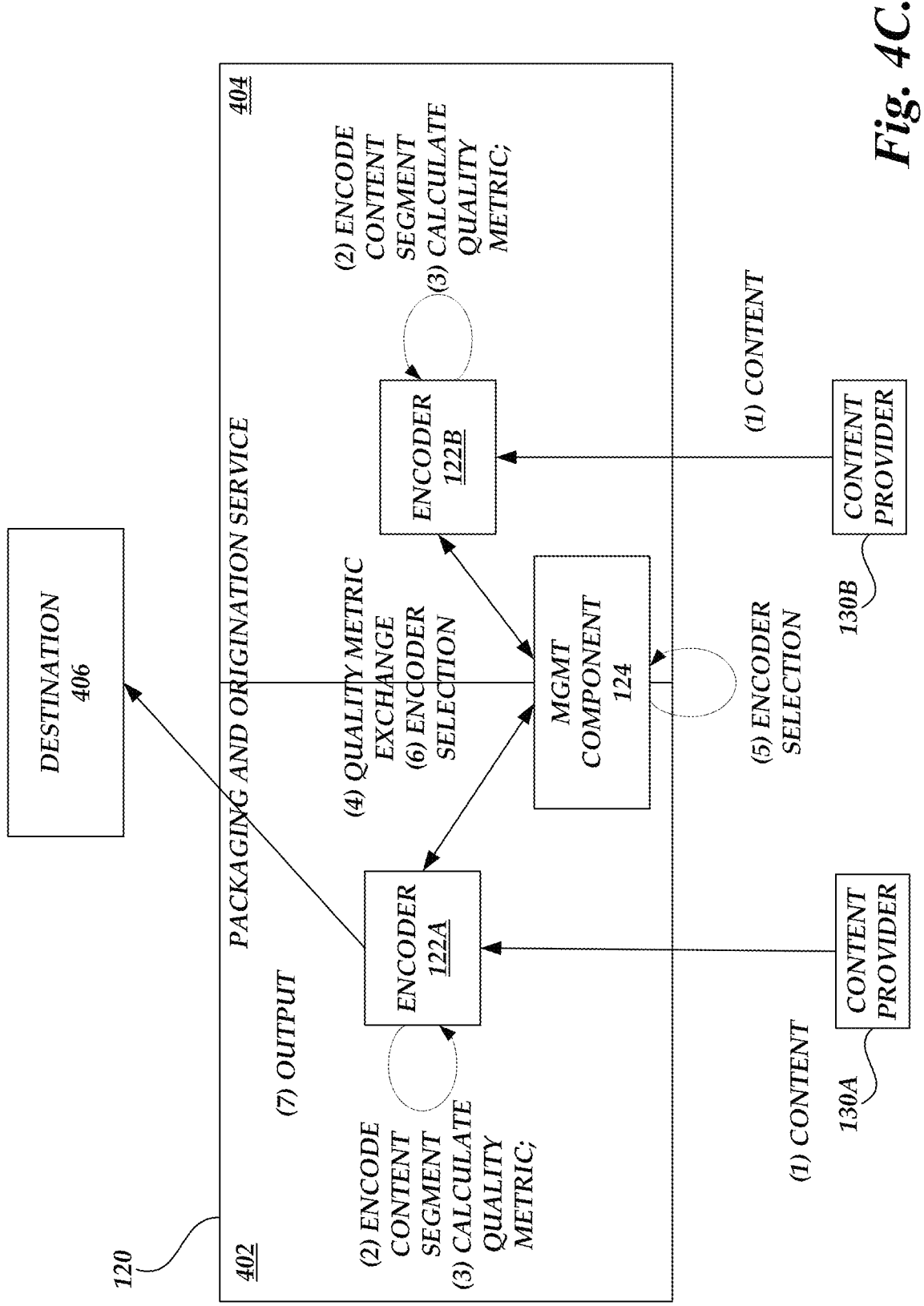

Turning now to FIGS. 4A-4C, an illustrative interaction for the coordination of a plurality of encoder components 122 will be described. For purposes of illustration, FIGS. 4A-4C illustrate interaction between two encoders 122A, 122B of the video packaging and origination service 120 corresponding to two availability zones 402, 404, two or more content providers 130A, 103B and a destination 406. Such interaction is representative in nature and could include a number of additional components or interactions. Additionally, although logically represented as components within the video packaging and origination service 120, the components may be implemented in different geographic areas and on physical computing devices. The interaction of FIGS. 4A-4C illustratively occur after the video packaging and origination service 120 as received a requesting entity request for streaming content.

For purposes of illustration, the content request from the user device 102 can be accomplished via access to one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 110. For purposes of illustration, the receiving POP 110 may not have a copy of the requested file and may need to retrieve at least a portion of the requested content.

With reference to FIG. 4A, at (1), encoder component 122A receives content to be encoded from content provider 130A and encoder component 122B receives content to be encode from content provider 130B. Illustratively, content provider 130A and content provider 130B are separate such that the input signal to encoder component 122A is different from the input signal to encoder component 122B. As will be described below, by having a different source and input signal, the encoder components 122A and 122B can have different quality metrics based at least on potential differences in quality of the input signals.

At (2), the encoding component 122A encodes the content according to one or more encoding profiles (e.g., combinations of encoding bitrate and format) corresponding to the content streams being provided to the requesting entities. As described above, by way of example, examples of encoding formats include various video, audio, close captioning or other encoding formats. Illustrative video encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Illustrative audio encoding formats include, but are not limited to, Advance Audio Coding ("AAC"), Dolby AC-3, Apple Lossless ("ALAC"), Free Lossless Audio Codec ("FLAC"), MPEG Audio, Real Audio, Windows Media Audio ("WMA"), and the like. Closed captioning encoding formats include, but are not limited to, various formats promulgated by the National Television System Committee ("NTSC"), Advanced Television Systems Committee ("ATSC") and the like.

At (3), the encoder components 122A and 122B determine quality metric associated with the content to be encoded. Illustratively, the quality metric information includes at least one of an availability of an encoder component, a quality measurement of an input signal or output signal corresponding to the content to be encoded, or a determination of whether the encoder component can transmit to an identified destination.

Generally described, the availability of the encoder component can correspond to an indication of the individual encoder to encode content segments. The availability can be expressed in a binary representation such that the encoder is either available or not available. In other embodiments, the availability can be expressed in terms of a percentage or categories based a measurement of the computing resources of the encoder component. For example, the availability of the encoder component can be expressed a percentage attributed to the percentage of the processor or memory components of the encoder component 122. The availability information can further include information related to historical trends regarding the availability of the encoder component 122, such as percentage associated with the amount of time historically the encoder component is available to encode content (e.g., an expression of 99% if the unavailability of the encoder component is 1% or less). Other measurements of the availability may also be incorporated.

Illustratively, the quality of the input signal from the source to the encoder component can be a measure of factors from the input signal that can affect the output of the encoded segment. Such measures can include a determination of whether an input packet error was detected or whether a decoding error was detected in processing the incoming signal. The quality of the output signal can include whether a frame error was detected. The quality of the input signal or output signal can be expressed numeric value that encapsulates a holistic evaluation of the encoded segment input signal or processing of the input signal.

The determination of whether the encoder component can transmit to an identified destination can correspond to an indication of whether the destination is available or a measure of the availability of the destination to the encoder component. The availability can be expressed in a binary representation such that the destination is either available or not available. In other embodiments, the availability can be expressed in terms of a percentage or categories based a measurement of latency to the destination, error rates (e.g., dropped packets or retransmitted packets), a measure of the number of logical network hops between the encoder component and destination, throughput measurements and the like. For example, the availability of the destination can be expressed a value attributed to the throughput of network communications. The availability information can further include information related to historical trends regarding the availability of the destination, such as value associated with historical network availability.

At (4), the encoder components 122A and 122B exchange calculated quality metric information. The encoder components 122A and 122B can utilize traditional networking or custom protocols to exchange information. Additionally, individual encoder components can be configured to observe a time out window that defines the amount of time an encoder component will wait to receive other metric information before implementing an encoder component coordination process.

At (5), the encoder components 122A and 122B select an encoder component that will transmit the encoded segment. As described above, the encoder components 122A, 122B may not specifically select which component will transmit the encoded segment. Rather, in one embodiment, each encoder component will execute the same (or similar) encoder coordination process that results in a determination whether that particular encoder component will transmit the encoded component. Generally, if the encoder components 122 have properly exchanged information, a parallel processing of the encoder coordination process will result in a single encoder component transmitting an encoded segment and the remaining encoder components not selecting to transmit the encoded segment. The encoder components not transmitting can choose not to start the encoding process, stop the encoding process or discard the encoded segment if the encoding process has been completed. In this embodiment, the encoder components not transmitting may not be aware of the identification of the encoder component that is transmitting. In other embodiments, the execution of the encoder coordination process can result in the identification of the encoder component that will be transmitting and the encoder components that will not be transmitting. This embodiment may be implemented in a management component 124 is utilized. Additionally, in other embodiments, the encoder coordination process can further take into account state information related to the encoder component that transmitted the previous segment such that encoder coordination process will be weighted in favor of a previously "selected" encoder component so long as quality thresholds will be met. Similarly, the encoder coordination process can further apply quality thresholds to all selections such that a minimal level of quality is required or an error is returned. Illustrative, routines for an encoder coordination process will be described with regard to FIGS. 5 and 6.

For purposes of illustration, assume that encoder 122A has a higher quality metric or has previously transmitted an encoded segment and continue to meet a quality threshold. Accordingly, at (6), the encoder 122A transmits the encoded segment to destination 406. With reference to the previous discussion, FIG. 4A illustrates how the destination can receive a single encoded segment from two or more available redundant encoded segment streams without requiring additional processing or logic at the destination 406.

Turning to FIG. 4B, another illustration of the selection of encoder component 122 will be described. Much of the interaction between the components illustrated in FIG. 4A is the same or similar. At (1), encoder component 122A receives content to be encoded from content provider 130A and encoder component 122B receives content to be encode from content provider 130B. As described above, content provider 130A and content provider 130B are separate such that the input signal to encoder component 122A is different from the input signal to encoder component 122B.

At (2), the encoding component 122A encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. At (3), the encoder components 122A and 122B determine quality metric associated with the content to be encoded. As describe above, the quality metric information includes at least one of an availability of an encoder component, a quality measurement of an input signal or output signal corresponding to the content to be encoded, or a determination of whether the encoder component can transmit to an identified destination.

The availability of the encoder component can correspond to an indication of the individual encoder to encode content segments. The availability can be expressed in a binary representation such that the encoder is either available or not available. In other embodiments, the availability can be expressed in terms of a percentage or categories based a measurement of the computing resources of the encoder component. For example, the availability of the encoder component can be expressed a value attributed to the processing load of the encoder component 122. The availability information can further include information related to historical trends regarding the availability of the encoder component 122, such as percentage associated with the amount of time historically the encoder component is available to encode content. Other measurements of the availability may also be incorporated.

The quality of the input signal from the source to the encoder component can be a measure of factors from the input signal that can affect the output of the encoded segment. Such measures can include a determination of whether an input packet error was detected or whether a decoding error was detected in processing the incoming signal. The quality of the output signal can include whether a frame error was detected. The quality of the input signal or output signal can be expressed numeric value that encapsulates a holistic evaluation of the encoded segment input signal or processing of the input signal.

The determination of whether the encoder component can transmit to an identified destination can correspond to an indication of whether the destination is available or a measure of the availability of the destination to the encoder component. The availability can be expressed in a binary representation such that the destination is either available or not available. In other embodiments, the availability can be expressed in terms of a percentage or categories based a measurement of latency to the destination, error rates (e.g., dropped packets or retransmitted packets), a measure of the number of logical network hops between the encoder component and destination, throughput measurements and the like. For example, the availability of the destination can be expressed a value attributed to the throughput of network communications. The availability information can further include information related to historical trends regarding the availability of the destination, such as value associated with historical network availability.

At (4), the encoder components 122A and 122B exchange calculated quality metric information. The encoder components 122A and 122B can utilize traditional networking or custom protocols to exchange information. Additionally, individual encoder components can be configured to observe a time out window that defines the amount of time an encoder component will wait to receive other metric information before implementing an encoder component coordination process.

At (5), the encoder components 122A and 122B select an encoder component that will transmit the encoded segment. As described above, the encoder components 122A, 122B may not specifically select which component will transmit the encoded segment. Rather, in one embodiment, each encoder component will execute the same (or similar) encoder coordination process that results in a determination whether that particular encoder component will transmit the encoded component. Generally, if the encoder components 122 have properly exchanged information, a parallel processing of the encoder coordination process will result in a single encoder component transmitting an encoded segment and the remaining encoder components not selecting to transmit the encoded segment. The encoder components not transmitting can choose not to start the encoding process, stop the encoding process or discard the encoded segment if the encoding process has been completed. In this embodiment, the encoder components not transmitting may not be aware of the identification of the encoder component that is transmitting. In other embodiments, the execution of the encoder coordination process can result in the identification of the encoder component that will be transmitting and the encoder components that will not be transmitting. This embodiment may be implemented in a management component 124 is utilized. Additionally, in other embodiments, the encoder coordination process can further take into account state information related to the encoder component that transmitted the previous segment such that encoder coordination process will be weighted in favor of a previously "selected" encoder component so long as quality thresholds will be met. Similarly, the encoder coordination process can further apply quality thresholds to all selections such that a minimal level of quality is required or an error is returned. Illustrative, routines for an encoder coordination process will be described with regard to FIGS. 5 and 6.

For purposes of illustration, assume that encoder 122B has a higher quality metric or encoder 122A, which has previously transmitted an encoded segment, does not continue to meet a quality threshold. Accordingly, at (6), the encoder 122B transmits the encoded segment to destination 406.

Turning now to FIG. 4C, an embodiment in which a management component 124 can be utilized in the selection of an encoder component 122 will be described. Much of the interaction between the components illustrated in FIGS. 4A and 4B is the same or similar. At (1), encoder component 122A receives content to be encoded from content provider 130A and encoder component 122B receives content to be encode from content provider 130B. As described above, content provider 130A and content provider 130B are separate such that the input signal to encoder component 122A is different from the input signal to encoder component 122B.

At (2), the encoding component 122A encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. At (3), the encoder components 122A and 122B determine quality metric associated with the content to be encoded. As describe above, the quality metric information includes at least one of an availability of an encoder component, a quality measurement of an input signal or output signal corresponding to the content to be encoded, or a determination of whether the encoder component can transmit to an identified destination.

The availability of the encoder component can correspond to an indication of the individual encoder to encode content segments. The availability can be expressed in a binary representation such that the encoder is either available or not available. In other embodiments, the availability can be expressed in terms of a percentage or categories based a measurement of the computing resources of the encoder component. For example, the availability of the encoder component can be expressed a value attributed to error rates exhibited by the encoder component 122. The availability information can further include information related to historical trends regarding the availability of the encoder component 122, such as percentage associated with the amount of time historically the encoder component is available to encode content. Other measurements of the availability may also be incorporated.

The quality of the input signal from the source to the encoder component can be a measure of factors from the input signal that can affect the output of the encoded segment. Such measures can include a determination of whether an input packet error was detected or whether a decoding error was detected in processing the incoming signal. The quality of the output signal can include whether a frame error was detected. The quality of the input signal or output signal can be expressed numeric value that encapsulates a holistic evaluation of the encoded segment input signal or processing of the input signal.

The determination of whether the encoder component can transmit to an identified destination can correspond to an indication of whether the destination is available or a measure of the availability of the destination to the encoder component. The availability can be expressed in a binary representation such that the destination is either available or not available. In other embodiments, the availability can be expressed in terms of a percentage or categories based a measurement of latency to the destination, error rates (e.g., dropped packets or retransmitted packets), a measure of the number of logical network hops between the encoder component and destination, throughput measurements and the like. For example, the availability of the destination can be expressed a value attributed to the throughput of network communications. The availability information can further include information related to historical trends regarding the availability of the destination, such as value associated with historical network availability.

At (4), the encoder components 122A and 122B do not necessarily exchange calculated quality metric information. Rather, the encoder components 122A and 122B can utilize traditional networking or custom protocols to provide the management component with quality metric information. At (5), the management component 124 selects an encoder component that will transmit the encoded segment. As described above, in some embodiments, the encoder components 122A, 122B may not specifically select which component will transmit the encoded segment. In this embodiment, however, the execution of the encoder coordination process can result in the identification of the encoder component that will be transmitting and the encoder components that will not be transmitting. Additionally, in other embodiments, the encoder coordination process can further take into account state information related to the encoder component that transmitted the previous segment such that encoder coordination process will be weighted in favor of a previously "selected" encoder component so long as quality thresholds will be met. Similarly, the encoder coordination process can further apply quality thresholds to all selections such that a minimal level of quality is required or an error is returned. At (6), the encoder selection is transmitted to at least the selected encoder component 122A or all the encoder components 122A, 122B.

For purposes of illustration, assume that encoder 122B has a higher quality metric or encoder 122A, which has previously transmitted an encoded segment, does not continue to meet a quality threshold. Accordingly, at (7), the encoder 122B transmits the encoded segment to destination 406.

Figure 5:
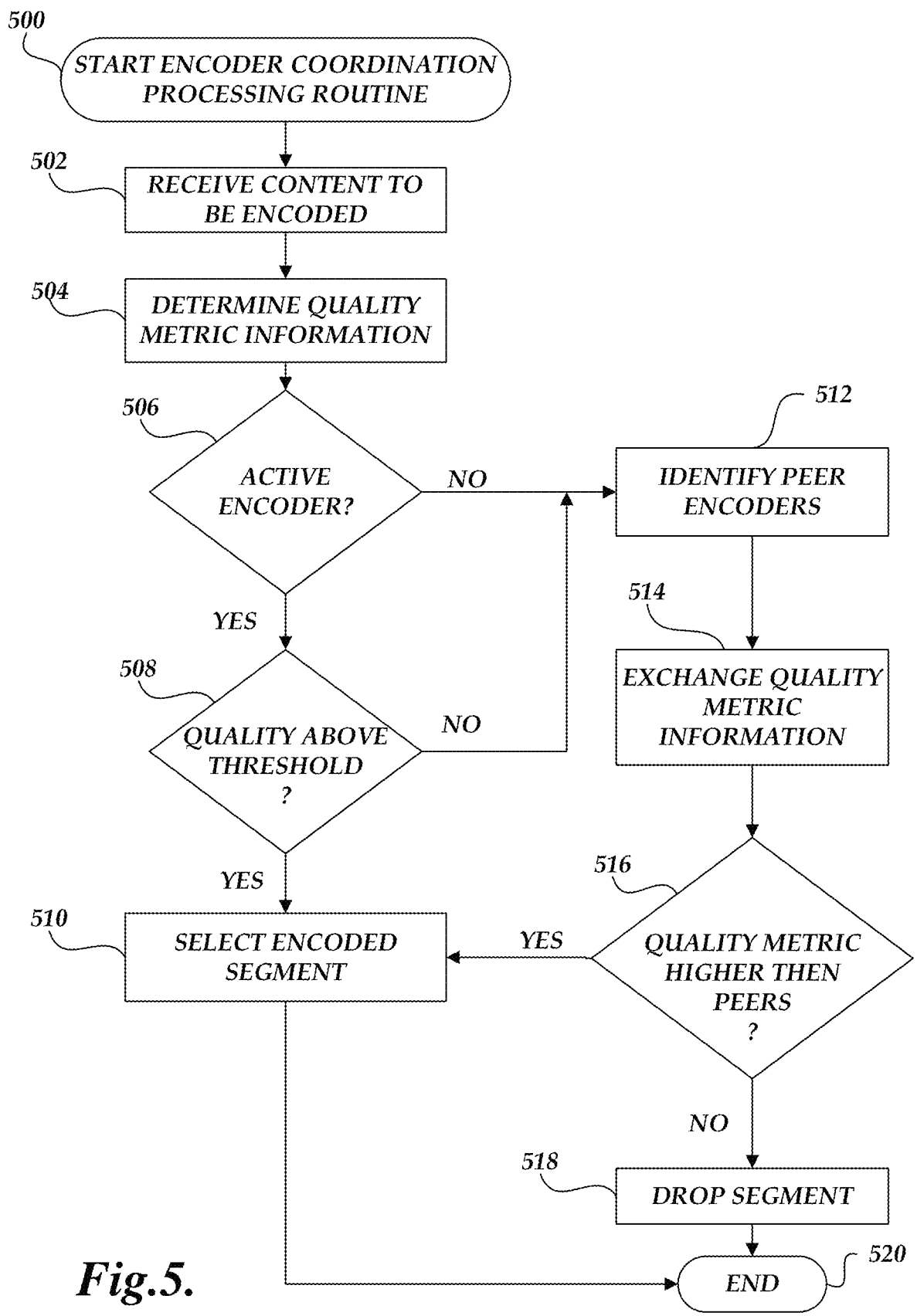
FIG. 5 is a flow diagram illustrative of an encoder coordination processing routine implemented by a video packaging and origination system in accordance with some embodiments.

Turning now to FIG. 5, a routine 500 for implementing an encoder coordination process will be described. Illustratively, routine 500 will be described with regard to implementation by individual encoder components. At block 502, the encoder component receives content to be encoded from a content provider 130. As described above, in some embodiments, to provide for redundancy at least two of the encoder components will received content from difference sources.

Illustratively, the encoding component encodes the content according to one or more encoding profiles (e.g., combinations of encoding bitrate and format) corresponding to the content streams being provided to the requesting entities. As described above, by way of example, examples of encoding formats include but not limited to various video, audio, closed captioning or other formats for encoding data. Illustrative video encoding formats can include the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Illustrative audio encoding formats include, but are not limited to, Advance Audio Coding ("AAC"), Dolby AC-3, Apple Lossless ("ALAC"), Free Lossless Audio Codec ("FLAC"), MPEG Audio, Real Audio, Windows Media Audio ("WMA"), and the like. Closed captioning encoding formats include, but are not limited to, various formats promulgated by the National Television System Committee ("NTSC"), Advanced Television Systems Committee ("ATSC") and the like.

At block 504, the encoder component determines quality metric associated with the content to be encoded. As describe above, the quality metric information includes at least one of an availability of an encoder component, a quality measurement of an input signal or output signal corresponding to the content to be encoded, a determination of whether the encoder component can transmit to an identified destination; or a quality measurement regarding a degree to which the encoded segment reproduces the input signal. In some embodiments, the quality metric information can include one or more of the above described characteristics. In other embodiments, the quality measurement information can include combinations of two or more of the above described characteristics. Still further, in other embodiments, the quality measurement information can include a combination of information from all of the above described characteristics. However, one skilled in the relevant art will appreciate that the present application is not limited to any particular combination of information from the different types of quality metric information unless specifically defined as such.

The availability of the encoder component can correspond to an indication of the individual encoder to encode content segments. The availability can be expressed in a binary representation such that the encoder is either available or not available. In other embodiments, the availability can be expressed in terms of a percentage or categories based a measurement of the computing resources of the encoder component. For example, the availability of the encoder component can be expressed a value attributed to the processing load of the encoder component 122. The availability information can further include information related to historical trends regarding the availability of the encoder component 122, such as percentage associated with the amount of time historically the encoder component is available to encode content. Other measurements of the availability may also be incorporated.

The quality of the input signal from the source to the encoder component can be a measure of factors from the input signal that can affect the output of the encoded segment including quality or errors associated with video, audio or other data. Such measures can include a determination of whether an input packet error was detected or whether a decoding error was detected in processing the incoming signal. The measures can also correspond to a detection on input packet errors or frame errors. The quality of the input signal can be expressed numeric value that encapsulates a holistic evaluation of the encoded segment input signal or processing of the input signal.

The determination of whether the encoder component can transmit to an identified destination can correspond to an indication of whether the destination is available or a measure of the availability of the destination to the encoder component. The availability can be expressed in a binary representation such that the destination is either available or not available. In other embodiments, the availability can be expressed in terms of a percentage or categories based a measurement of latency to the destination, error rates (e.g., dropped packets or retransmitted packets), a measure of the number of logical network hops between the encoder component and destination, throughput measurements and the like. For example, the availability of the destination can be expressed a value attributed to the throughput of network communications. The availability information can further include information related to historical trends regarding the availability of the destination, such as value associated with historical network availability.

The quality measurement regarding a degree to which the encoded segment reproduces the input signal can generally refer to quality or errors associated with the video, audio, or other data reproduced by the encoders 124. In some embodiments, the quality measurement can correspond from the perspective of the end user/user device 102 in a characterization of whether errors are perceptible to the end user. Such measures can include a determination of whether an out packet error was detected or whether a encode error was detected in generating the encoded segment from the incoming signal. The measures can also correspond to a detection on output packet errors or frame errors. The quality of the encoded segment can be expressed numeric value that encapsulates a holistic evaluation of the encoded segment or processing of the encoded segment.

At decision block 506, a test is conducted to determine whether the encoder component executing the encoder coordination process was the encoder component that encoded the previously transmitted encoded segment. If so, the encoder component is considered the active encoder component and the process may weigh in favor of keeping the active encoder component. More specifically, routine 500 moves to decision block 508, to determine whether the quality metric of active encoder component is above a quality threshold. The threshold can illustratively be defined based on an established minimal quality for a segment, a value of one or more previously encoded segments (e.g., an average), a value of one or more current segments, and the like. If at decision block 508, the quality threshold is met or exceeded, at block 510, the routine 500 selects the current encoder component to transmit.

Returning to decision blocks 506 and 508, if the encoder component is not the active component (decision block 506) or the threshold quality is not met (decision block 508), at block 512, the encoder component identifies peer encoder components that will be possible redundant sources of the encoded segment. For example, the packaging and origination service 120 may maintain a database that identifies possible peer encoder components. At block 514, the encoder components exchange calculated quality metric information. The encoder components 122A and 122B can utilize traditional networking or custom protocols to exchange information. Additionally, individual encoder components can be configured to observe a time out window that defines the amount of time an encoder component will wait to receive other metric information before implementing an encoder component coordination process.

At decision block 516, the encoder component selects an encoder component that will transmit the encoded segment by examining quality metric information for the peer encoders and determining whether the quality metric information for the encoder components executing routine 500 is greater than the quality metric information for the peer group of encoder components. As described above, the encoder component may not specifically select which component will transmit the encoded segment. Rather, in one embodiment, each encoder component will execute the same (or similar) encoder coordination process that results in a determination whether that particular encoder component will transmit the encoded component. Generally, if the encoder components have properly exchanged information, a parallel processing of the encoder coordination process will result in a single encoder component transmitting an encoded segment and the remaining encoder components not selecting to transmit the encoded segment. The encoder components not transmitting can choose not to start the encoding process, stop the encoding process or discard the encoded segment if the encoding process has been completed. In this embodiment, the encoder components not transmitting may not be aware of the identification of the encoder component that is transmitting. In other embodiments, the execution of the encoder coordination process can result in the identification of the encoder component that will be transmitting and the encoder components that will not be transmitting. Similarly, decision block 516 can further apply quality thresholds to all quality metric information such that a minimal level of quality is required or an error is returned. For example, if the encoder component executing routine 500 does not have quality metric information that exceeds a threshold amount, the encoder component may still not select to transmit an encoded segment If at decision block 516, the encoder component has a higher quality metric information than the peer encoder components (and optionally has exceed a quality threshold), the routine 500 returns to block 510 and selects the current encoder component to transmit. Alternatively, if the encoder has not exceeded the quality threshold or otherwise does not have higher quality metric information than the peer encoder components, at block 518, the encoder component can drop, delete or otherwise prevent the encoded component from being transmitted. At block 520, the routine 500 terminates or is repeated for the next segment to be encoded.

Figure 6:
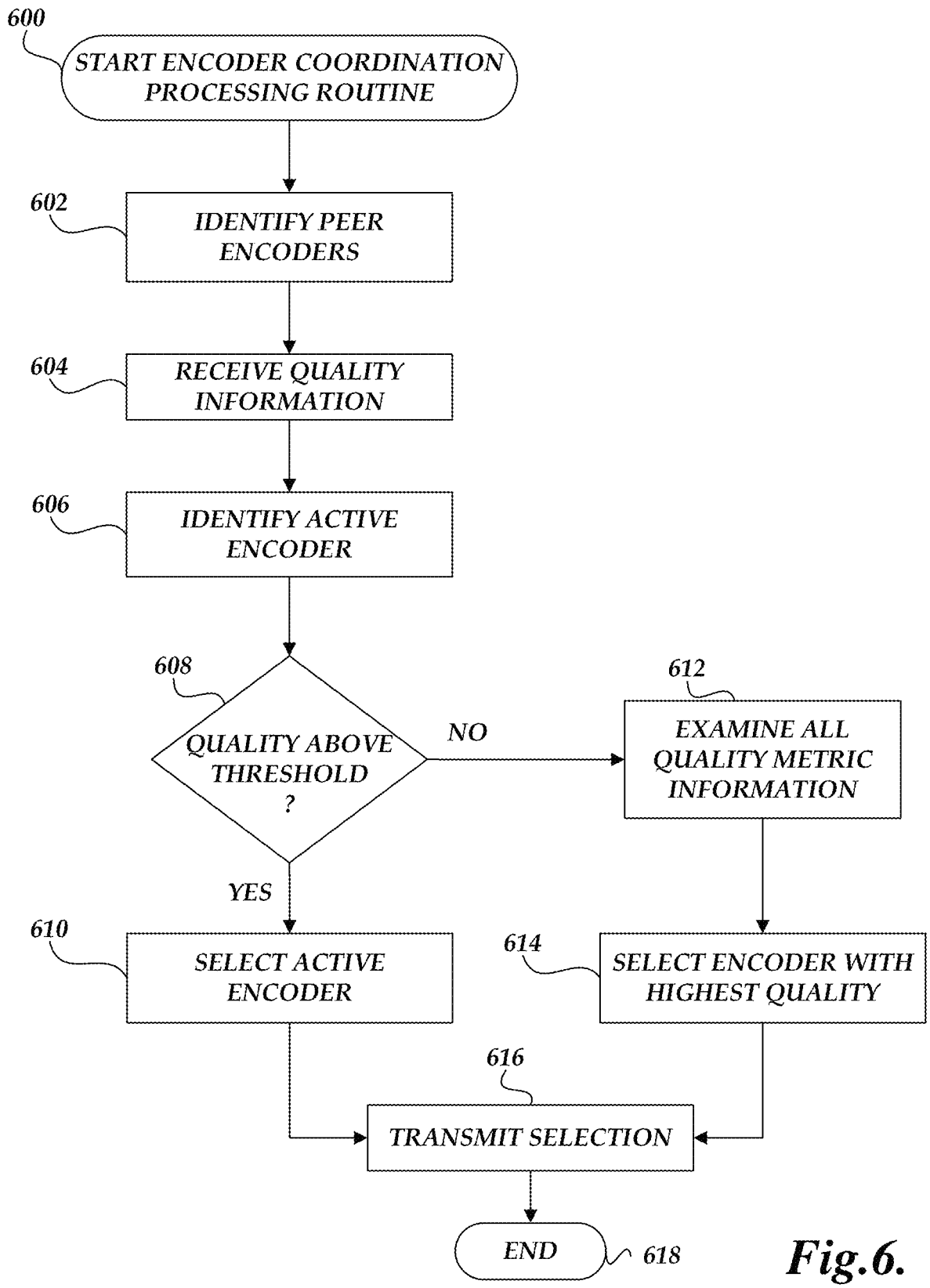
FIG. 6 is a flow diagram illustrative of an encoder coordination routine implemented by a computing device in accordance with some embodiments.

Turning now to FIG. 6, a routine 600 for implementing an encoder coordination process will be described. Illustratively, routine 600 will be described with regard to implementation by individual encoder components or a management component for the identification of an encoder component and will generally referred to as being implemented by a computing device. At block 602, the computing device identifies peer encoder components that will be possible redundant sources of the encoded segment. For example, the packaging and origination service 120 may maintain a database that identifies possible peer encoder components. At block 514, the encoder components exchange calculated quality metric information. The encoder components 122A and 122B can utilize traditional networking or custom protocols to exchange information. Additionally, individual encoder components can be configured to observe a time out window that defines the amount of time an encoder component will wait to receive other metric information before implementing an encoder component coordination process.

At block 604, the quality metric associated with the content to be encoded. As describe above, the quality metric information includes at least one of an availability of an encoder component, a quality measurement of an input signal or output signal corresponding to the content to be encoded, or a determination of whether the encoder component can transmit to an identified destination.

The availability of the encoder component can correspond to an indication of the individual encoder to encode content segments. The availability can be expressed in a binary representation such that the encoder is either available or not available. In other embodiments, the availability can be expressed in terms of a percentage or categories based a measurement of the computing resources of the encoder component. For example, the availability of the encoder component can be expressed a value attributed to the processing load of the encoder component 122. The availability information can further include information related to historical trends regarding the availability of the encoder component 122, such as percentage associated with the amount of time historically the encoder component is available to encode content. Other measurements of the availability may also be incorporated.

The quality of the input signal from the source to the encoder component can be a measure of factors from the input signal that can affect the output of the encoded segment. Such measures can include a determination of whether an input packet error was detected or whether a decoding error was detected in processing the incoming signal. The quality of the output signal can include whether a frame error was detected. The quality of the input signal or output signal can be expressed numeric value that encapsulates a holistic evaluation of the encoded segment input signal or processing of the input signal.

The determination of whether the encoder component can transmit to an identified destination can correspond to an indication of whether the destination is available or a measure of the availability of the destination to the encoder component. The availability can be expressed in a binary representation such that the destination is either available or not available. In other embodiments, the availability can be expressed in terms of a percentage or categories based a measurement of latency to the destination, error rates (e.g., dropped packets or retransmitted packets), a measure of the number of logical network hops between the encoder component and destination, throughput measurements and the like. For example, the availability of the destination can be expressed a value attributed to the throughput of network communications. The availability information can further include information related to historical trends regarding the availability of the destination, such as value associated with historical network availability.

At block 606, the computing device identifies the encoder component that was the encoder component that encoded the previously transmitted encoded segment. For the identified active encoder component, the computing device moves to decision block 608 to determine whether the quality metric of active encoder component is above a quality threshold. The threshold can illustratively be defined based on an established minimal quality for a segment, a value of one or more previously encoded segments (e.g., an average), a value of one or more current segments, and the like. If at decision block 608, the quality threshold is met or exceeded, at block 610, the computing devices selects the current encoder component to transmit at block 616.

Returning to decision block 608, the threshold quality is not met, at block 616, the computing device examines all the quality metrics from the peer encoder components and selects an encoder component that will transmit the encoded segment at block 618. As described above, the encoder component may not specifically select which component will transmit the encoded segment. Rather, in one embodiment, each encoder component will execute the same (or similar) encoder coordination process that results in a determination/transmission whether that particular encoder component will transmit the encoded component. Generally, if the encoder components have properly exchanged information, a parallel processing of the encoder coordination process will result in a single encoder component transmitting an encoded segment and the remaining encoder components not selecting to transmit the encoded segment. The encoder components not transmitting can choose not to start the encoding process, stop the encoding process or discard the encoded segment if the encoding process has been completed. In this embodiment, the encoder components not transmitting may not be aware of the identification of the encoder component that is transmitting. In other embodiments, the execution of the encoder coordination process can result in the identification of the encoder component that will be transmitting and the encoder components that will not be transmitting. Similarly, block 614 can further apply quality thresholds to all selections such that a minimal level of quality is required or an error is returned.

At block 616, the computing device transmits the selection. At block 618, the routine 600 terminates or is repeated for the next segment to be encoded.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to encode content comprising:
   at least one computing device associated with a first encoder component, wherein the first encoder component is configured to:
     receive content to be encoded according to an encoding profile;
     determine first quality metric information related to the content to be encoded, wherein the quality metric information includes an availability of the first encoder component, a quality measurement of an input signal to the first encoder component corresponding to the content to be encoded corresponding from a first source, and a determination of whether the first encoder component can transmit to an identified destination; and
     transmit the first quality metric information to a second encoder component; and
   at least one computing device associated with a second encoder component, wherein the second encoder component is configured to:
     receive content to be encoded according to an encoding profile;
     determine second quality metric information related to the content to be encoded, wherein the quality metric information includes at least two of an availability of the second encoder component, a quality measurement of an input signal to the second encoder component corresponding to the content to be encoded corresponding to a second input source, a determination of whether the second encoder component can transmit to an identified destination, or a quality measurement regarding a degree to which the encoded segment reproduces the input signal; and
     transmit the second quality metric information to the first encoder component;
   wherein the first and second encoder components select to transmit a current segment of the content to be encoded based on a processing of the first and second quality metric information.

2. The system of claim 1, wherein the destination corresponds to a media endpoint.

3. The system of claim 1, wherein the destination corresponds to a user device.

4. The system of claim 1, wherein the first and second encoder components select to transmit the current segment based at least in part on an encoder component that transmitted a previous segment of the content to be encoded.

5. The system of claim 1, wherein the first encoder component corresponds to a first availability zone and wherein the second encoder component corresponds to a second availability zone.

6. A computer-implemented method to manage encoder components comprising:
   receiving content to be encoded;
   transmitting quality metric information related to the content to be encoded to at least one additional encoder component; and
   selecting whether to transmit an encoded segment based at least in part on a processing of the quality metric information.

7. The computer-implemented method of claim 6, wherein the quality metric information includes at least one of an availability of a second encoder component, a quality measurement of an input signal to the second encoder component corresponding to the content to be encoded corresponding to a second input source a determination of whether the second encoder component can transmit to an identified destination, or a quality measurement regarding a degree to which the encoded segment reproduces the input signal.

8. The computer-implemented method of claim 7, wherein the quality metric information includes an availability of the second encoder component, a quality measurement of an input signal to the second encoder component corresponding to the content to be encoded corresponding to a second input source a determination of whether the second encoder component can transmit to an identified destination and a quality measurement regarding a degree to which the encoded segment reproduces the input signal.

9. The computer-implemented method of claim 6 further comprising transmitting to a destination responsive to a selection to transmit the encoded segment.

10. The computer-implemented method of claim 9, wherein the destination corresponds to a storage location.

11. The computer-implemented method of claim 9, wherein the destination corresponds to a user device requesting the encoded content.

12. The computer-implemented method of claim 6, wherein the at least one additional encoder component corresponds to an encoder component associated with a different availability zone.

13. The computer-implemented method of claim 6, wherein selecting whether to transmit an encoded segments based at least in part on the processing of the quality metric information further includes selecting whether to transmit encoded segments based on an encoder component associated with a previous encoded segment.

14. The computer-implemented method of claim 13, wherein selecting whether to transmit encoded segments based on an encoder component associated with a previous encoded segment includes selecting the encoder component associated with the previous encoded segment based on exceeding quality metric threshold.

15. A computer-implemented method to manage encoder components comprising:
 receiving quality metric information related to a plurality of encoder components configured to provide encoded content responsive to a request, wherein the plurality of encoder components correspond to different availability zones; and
 selecting an encoder component of the plurality of encoder components to transmit an encoded segment based at least in part on a comparison of the received quality metric information from the plurality of encoder components.

16. The computer-implemented method of claim 15, wherein the quality metric information includes at least a combination of two or more an availability of a second encoder component, a quality measurement of an input signal to the second encoder component corresponding to the content to be encoded corresponding to a second input source, a determination of whether the second encoder component can transmit to an identified destination or a quality measurement regarding a degree to which the encoded segment reproduces the input signal.

17. The computer-implemented method of claim 15, wherein selecting an encoder component to transmit an encoded segment based at least in part on a comparison of the received quality metric information includes determining to transmit the encoded segment.

18. The computer-implemented method of claim 15, wherein selecting an encoder component to transmit an encoded segment based at least in part on a comparison of the received quality metric information includes determining to not transmit the encoded segment.

19. The computer-implemented method of claim 15 further comprising transmitting a notification of a selection of an encoder component to transmit an encoded segment based at least in part on a comparison of the received quality metric information.

20. The computer-implemented method of claim 15 further comprising transmitting quality metric information among the plurality of encoder components.

* * * * *

UNITED STATES PATENT AND TRADEMARK OFFICE
CERTIFICATE OF CORRECTION

| | |
|---|---|
| PATENT NO. | : 10,630,990 B1 |
| APPLICATION NO. | : 15/968669 |
| DATED | : April 21, 2020 |
| INVENTOR(S) | : John Robert Saxton |

Page 1 of 1

It is certified that error appears in the above-identified patent and that said Letters Patent is hereby corrected as shown below:

On Sheet 7 of 8, FIG. 5, Reference Number 516, Line 2, delete "then" and insert --than--.

In Column 16, Line 17, delete "segment" and insert --segment.--.

In Column 21, Line 6, Claim 7, delete "source" and insert --source,--.

In Column 21, Line 16, Claim 8, delete "source" and insert --source,--.

In Column 21, Line 17, Claim 8, delete "destination" and insert --destination,--.

In Column 22, Line 21, Claim 16, delete "destination" and insert --destination,--.

Signed and Sealed this
Fourteenth Day of July, 2020

Andrei Iancu
*Director of the United States Patent and Trademark Office*